(12) United States Patent
Abedini et al.

(10) Patent No.: US 11,277,830 B2
(45) Date of Patent: Mar. 15, 2022

(54) CONFIGURATION OF SOFT TIME RESOURCES FOR AN IAB NODE WITH MULTIPLE PARENT NODES

(71) Applicant: QUALCOMM Incorporated, San Diego, CA (US)

(72) Inventors: Navid Abedini, Somerset, NJ (US); Jianghong Luo, Skillman, NJ (US); Luca Blessent, Whitehouse Station, NJ (US); Muhammad Nazmul Islam, Littleton, MA (US); Karl Georg Hampel, Hoboken, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/669,364

(22) Filed: Oct. 30, 2019

(65) Prior Publication Data

US 2020/0145991 A1 May 7, 2020

Related U.S. Application Data

(60) Provisional application No. 62/754,523, filed on Nov. 1, 2018.

(51) Int. Cl.
*H04W 72/04* (2009.01)
*H04B 7/155* (2006.01)
*H04W 84/04* (2009.01)

(52) U.S. Cl.
CPC ...... *H04W 72/0426* (2013.01); *H04W 84/045* (2013.01)

(58) Field of Classification Search
CPC ........... H04W 72/0426; H04W 84/045; H04W 40/32; H04B 7/15542
See application file for complete search history.

(56) References Cited

U.S. PATENT DOCUMENTS 10,924,212 B2 * 2/2021 Cao .................. H03M 13/3723
2014/0036804 A1 2/2014 Chen et al.
(Continued)

FOREIGN PATENT DOCUMENTS

CN R1-1812042 * 10/2018
WO 2018048642 A1 3/2018
WO WO2018/048642 A1 * 3/2018 ............ H04W 74/08

OTHER PUBLICATIONS

Ericsson: "Updated Summary of 7.2.3.1 Enhancements to Support NR Backhaul links", 3GPP TSG RAN WG1 Meeting #94bis, 3GPP Draft; R1-1812042, 3rd Generation Partnership Project (3GPP), Mobile Competence Centre; 650, Route Des Lucioles; F-06921 Sophia-Antipolis Cedex; France, vol. RAN WG1, No. Chengdu, China; Oct. 8, 2018-Oct. 12, 2018 Oct. 12, 2018, XP051519366, Retrieved from the Internet: URL:http://www.3gpp.org/ftp/tsg%5Fran/WG1%5FRL1/TSGR1%5F94b/Docs/R1%2D1812042%2Ezip [retrieved on Oct. 12, 2018], pp. 3-4, Vivo, pp. 9-15.
(Continued)

*Primary Examiner* — Joseph E Dean, Jr.
(74) *Attorney, Agent, or Firm* — Qualcomm Incorporated

(57) ABSTRACT

Various aspects of the present disclosure generally relate to wireless communication. In some aspects, a wireless node may receive association information for a set of soft resources of the wireless node. The association information may indicate one or more parent nodes associated with a soft resource of the set of soft resources. The set of soft resources may be configurable as schedulable or non-schedulable for the wireless node. The wireless node may determine one or more release indications associated with the soft resource. The wireless node may schedule on the soft resource based at least in part on determining the one or more release indications. Numerous other aspects are provided.

68 Claims, 9 Drawing Sheets

(56) References Cited

U.S. PATENT DOCUMENTS

| | | | |
|---|---|---|---|
| 2016/0344527 | A1 | 11/2016 | Blankenship et al. |
| 2017/0323343 | A1* | 11/2017 | Dey .................. G06Q 30/0264 |
| 2018/0302899 | A1 | 10/2018 | Aijaz |
| 2019/0021032 | A1 | 1/2019 | Bergstrom et al. |
| 2019/0141762 | A1 | 5/2019 | Novlan et al. |
| 2019/0150213 | A1 | 5/2019 | Kim |
| 2019/0349079 | A1 | 11/2019 | Novlan et al. |
| 2020/0084688 | A1 | 3/2020 | Mildh et al. |
| 2020/0100124 | A1 | 3/2020 | Hampel et al. |
| 2020/0145992 | A1 | 5/2020 | Abedini et al. |
| 2020/0145993 | A1 | 5/2020 | Abedini et al. |
| 2020/0146099 | A1 | 5/2020 | Abedini et al. |
| 2021/0195674 | A1* | 6/2021 | Park .................. H04B 7/15557 |

OTHER PUBLICATIONS

International Search Report and Written Opinion—PCT/US2019/059198—ISA/EPO—dated Feb. 11, 2020.

CATT: "NR Physical Layer Design for IAB Backhaul Link", 3GPP Draft, 3GPP TSG RAN WG1 Meeting #94bis, R1-1810538_IAB, 3rd Generation Partnership Project (3GPP), Mobile Competence Centre, 650, Route Des Luciolles, F-06921, Sophia-Antipolis Cedex, France, vol. RAN WG1, No. Chengdu, China; Oct. 8, 2018-Oct. 12, 2018, Sep. 29, 2018, XP051517946, 7 Pages, Retrieved from the Internet: URL: http://www.3gpp.org/ftp/tsg%5Fran/WG1%5FRL1/TSGR1%5F94b/Docs/R1%2D1810538%2Ezip [retrieved on Sep. 29, 2018] the whole document.

Ericsson: "Resource Allocation and Scheduling of IAB Networks", 3GPP Draft, 3GPP TSG-RAN WG1 Meeting #94bis, R1-1811513, 3rd Generation Partnership Project (3GPP), Mobile Competence Centre; 650, Route Des Luciolles; F-06921 Sophia-Antipolis Cedex; France, vol. RAN WG1, No. Chengdu, China; Oct. 8, 2018-Oct. 12, 2018, Sep. 28, 2018, XP051518915, 11 pages, Retrieved from the Internet: URL:http://www.3gpp.org/ftp/tsg%5Fran/WG1%5FRL1/TSGR1%5F94b/Docs/R1%2D1811513%2Ezip [retrieved on Sep. 28, 2018] 2 Resource coordination limitations.<span id="_wysihtml5-undo" class="_wysihtml5-temp">.

Ericsson: "Timing of IAB-node Transmissions," 3GPP Draft, 3GPP TSG-RAN WG1 Meeting #94bis, R1-1811449, 3rd Generation Partnership Project (3GPP), Mobile Competence Centre, 650, Route Des Luciolles, F-06921, Sophia-Antipolis Cedex, France, vol. RAN WG1, No. Chengdu, China; Oct. 8, 2018-Oct. 12, 2018, Sep. 28, 2018 (Sep. 28, 2018), XP051518852, 4 pages, Retrieved from the Internet: URL: http://www.3gpp.org/ftp/tsg%5Fran/WG1%5FRL1/TSGR1%5F94b/Docs/R1%2D1811449%2Ezip [retrieved on Sep. 28, 2018], 2 Discussion.

Ericsson: "Physical Layer Aspects of IAB," 3GPP Draft, 3GPP TSG-RAN WG1 Meeting #94bis, R1-1811512, 3rd Generation Partnership Project (3GPP), Mobile Competence Centre, 650, Route Des Luciolles, F-06921, Sophia-Antipolis Cedex, France, vol. RAN WG1, No. Chengdu, China, Oct. 8, 2018-Oct. 12, 2018, Sep. 28, 2018 (Sep. 28, 2018), XP051518914, 4 pages, Retrieved from the Internet: URL: http://www.3gpp.org/ftp/tsg%5Fran/WG1%5FRL1/TSGR1%5F94b/Docs/R1%2D1811512%2Ezip [retrieved on Sep. 28, 2018] Observation 4.

Intel Corporation: "PHY Enhancements for NR IAB," 3GPP Draft, 3GPP TSG RAN WG1 #94bis, R1-1810770, 3rd Generation Partnership Project (3GPP), Mobile Competence Centre, 650, Route Des Luciolles, F-06921, Sophia-Antipolis Cedex, France, vol. RAN WG1, Oct. 8, 2018-Oct. 12, 2018, Sep. 29, 2018 (Sep. 29, 2018), pp. 1-13, XP051518175, Retrieved from the Internet URL:http://www.3gpp.org/ftp/tsg%5Fran/WG1%5FRL1/TSGR1%5F94b/Docs/R1%2D1810770%2Ezip sections 3, 3.1, 3.2, 5, 5.2, 5.3.

NEC: "Discussion on IAB", 3GPP Draft, 3GPP TSG RAN WG1 Meeting #94b, R1-1810806, Discussion on IAB, 3rd Generation Partnership Project (3GPP), Mobile Competence Centre, 650, Route Des Luciolles, F-06921, Sophia-Antipolis Cedex, France, vol. RAN WG1, No. Chengdu, China; Oct. 8, 2018-Oct. 12, 2018, Sep. 28, 2018 (Sep. 28, 2018), XP051518211, 2 pages, Retrieved from the Internet: URL:http://www.3gpp.org/ftp/tsg%5Fran/WG1%5FRL1/TSGR1%5F94b/Docs/R1%2D1810806%2Ezip [retrieved on Sep. 28, 2018], sections 1, 3.

NEC: "Resource Allocation for NR PUCCH", 3GPP Draft, 3GPP TSG RAN WG1 Meeting 91, R1-1720380 PUCCH_RESOURCE_ALLOCATION_V3E, 3rd Generation Partnership Project (3GPP), Mobile Competence Centre, 650, Route Des Luciolles, F-06921 Sophia-Antipolis Cedex, France, vol. RAN WG1, No. Reno, Nevada; Nov. 27, 2017-Dec. 1, 2017, Nov. 18, 2017, XP051369943, Retrieved from the Internet: URL:http://www.3gpp.org/ftp/tsg%5Fran/WG1%5FRL1/TSGR1%5F91/Docs/ [retrieved on Nov. 18, 2017], 8 pages.

Qualcomm Incorporated: "IAB Resource Management", 3GPP Draft, 3GPP TSG RAN WG1 Meeting #94, R1-1809444, 3rd Generation Partnership Project (3GPP), Mobile Competence Centre, 650, Route Des Luciolles, F-06921, Sophia-Antipolis Cedex, France, vol. RAN WG1, No. Gothenburg, Sweden, Aug. 20, 2018-Aug. 24, 2018, Aug. 17, 2018 (Aug. 17, 2018), XP051516809, 6 Pages, Retrieved from the Internet: URL: http://www.3gpp.org/ftp/tsg%5Fran/WG1%5FRL1/TSGR1%5F94/Docs/R1%2D1809444%2Ezip [retrieved on Aug. 17, 2018], pp. 2-5, 2.1 Baseline Approach: Semi-Static Resource Partitioning p. 5, 2.2 Enhanced Approach: Dynamic Resource Coordination Figures 2, 4, 5, Sections 2-3, paragraphs [0001]-[0002].

Qualcomm Incorporated: "IAB Resource Partitioning for Architecture Group 1", 3GPP Draft, 3GPP TSG RAN WG2 Meeting #102, R2-1808006 IAB Resource Partitioning for Architecture Group 1, 3rd Generation Partnership Project (3GPP), Mobile Competence Centre, 650, Route Des Luciolles, F-06921 Sophia-Antipolis Cede, vol. RAN WG2, No. Busan, South Korea, May 21, 2018-May 25, 2018, May 20, 2018 (May 20, 2018), XP051444329, 3 Pages, Retrieved from the Internet: URL: http://www.3gpp.org/ftp/Meetings%5F3GPP%5FSYNC/RAN2/Docs/[retrieved on May 20, 2018], p. 2, figure 2, figures 1, 2, sections 1, 2.

Qualcomm Incorporated: "Resource Allocation and Transmit Diversity for PUCCH", 3GPP Draft, 3GPP TSG RAN WG1 Meeting #90b, R1-1718566 Resource Allocation for PUCCH, 3rd Generation Partnership Project (3GPP), Mobile Competence Centre, 650, Route Des Luciolles, F-06921, Sophia-Antipolis Cedex, France, vol. RAN WG1, No. Prague, CZ, Oct. 9, 2017-Oct. 13, 2017, Oct. 8, 2017 (Oct. 8, 2017), XP051341747, 14 pages, Retrieved from the Internet:URL:http://www.3gpp.org/ftp/Meetings_3GPP_SYNC/RAN1/Docs/, [retrieved on Oct. 8, 2017], figures 1,2, sections 1, 2.

Qualcomm Incorporated: "Resource Allocation for PUCCH," 3GPP Draft, 3GPP TSG RAN WG1 Meeting #91, R1-1720686 Resource Allocation for PUCCH, 3rd Generation Partnership Project (3GPP), Mobile Competence Centre; 650, Route Des Luciolles; F-06921 Sophia-Antipolis Cedex; France, vol. RAN WG1, No. Reno, US; Nov. 27, 2017-Dec. 1, 2017, Nov. 18, 2017, XP051370147, 22 pages, Retrieved from the Internet: URL: http://www.3gpp.org/ftp/tsg%5Fran/WG1%5FRL1/TSGR1%5F91/Docs/ [retrieved on Nov. 18, 2017].

Qualcomm Incorporated: "Resource Management in IAB Network," 3GPP Draft, 3GPP TSG RAN WG1 Meeting #94bis, R1-1811258, 3rd Generation Partnership Project (3GPP), Mobile Competence Centre, 650, Route Des Luciolles, F-06921 Sophia-Antipolis Cedex, France, vol. RAN WG1, No. Chengdu, China, Oct. 8, 2018-Oct. 12, 2018, Sep. 29, 2018 (Sep. 29, 2018), XP051518661, 8 pages, Retrieved from the Internet: URL: http://www.3gpp.org/ftp/tsg%5Fran/WG1%5FRL1/TSGR1%5F94b/Docs/R1%2D1811258%2Ezip [retrieved on Sep. 29, 2018] Figures 1-5, Sections 2-3, Chapter 2.1 "Indication of Resource Partition Pattern", 2.2 Interaction between Resource Partition Pattern and Rel15 Resource Allocation, pp. 5-7, Chapter 2.3 "Dynamic Coordination with Extended SFI and UL Feedback", Chapter 3 "Conclusion".

Vivo: "Enhancements to Support NR Backhaul Link", 3GPP Draft, 3GPP TSG RAN WG1 Meeting #94bis, R1-1810387, Enhancements to Support NR Backhaul Link-Final, 3rd Generation Partnership Project (3GPP), Mobile Competence Centre, 650, Route Des Luciolles, F-06921, Sophia-Antipolis Cedex, France, vol. RAN WG1, No. Chengdu, China; Oct. 8, 2018-Oct. 12, 2018, Sep. 29, 2018 (Sep. 29, 2018), XP051517796, pp. 1-9, Retrieved from the Internet : URL:http://www.3gpp.org/ftp/tsg%5Fran/WG1%5FRL1/

(56) References Cited

OTHER PUBLICATIONS

TSGR1%5F94b/Docs/R1%2D1810387%2Ezip [Retrieved on Sep. 29, 2018], sections 2.1.1, 2.2.1, 2.3.1, 2.3.2, 2.5.
MCC Support: "Draft Report of 3GPP TSG RAN WG1 #94bis v0.1.0", 3GPP TSG RAN WG1 Meeting #95, R1-181xxxx, Spokane, USA, Nov. 12-16, 2018, 190 Pages (submission date: Oct. 16, 2018).
MCC Support: "Final Report of 3GPP TSG RAN WG1 #94bis v1.0.0", 3GPP Draft, 3GPP TSG RAN WG1 Meeting #95, R1-1812101, Spokane, USA, Nov. 12-16, 2018, 197 Pages.

\* cited by examiner

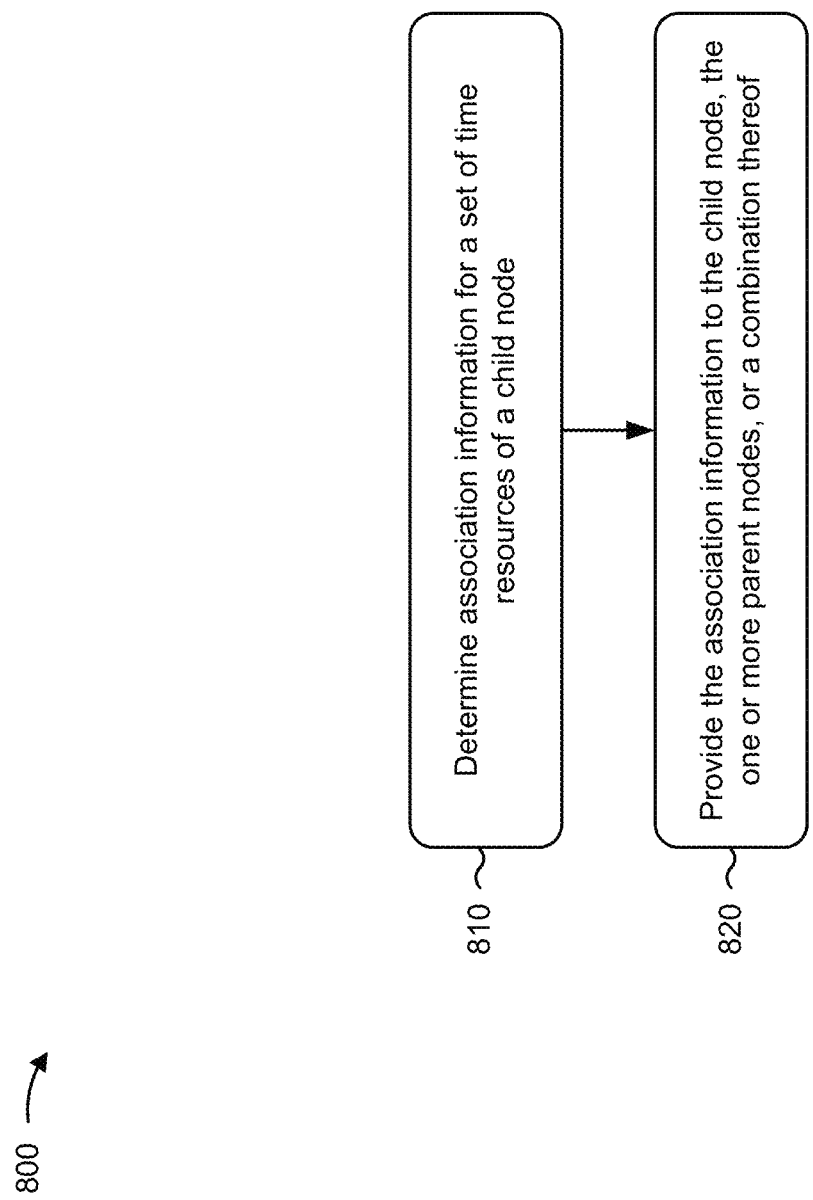

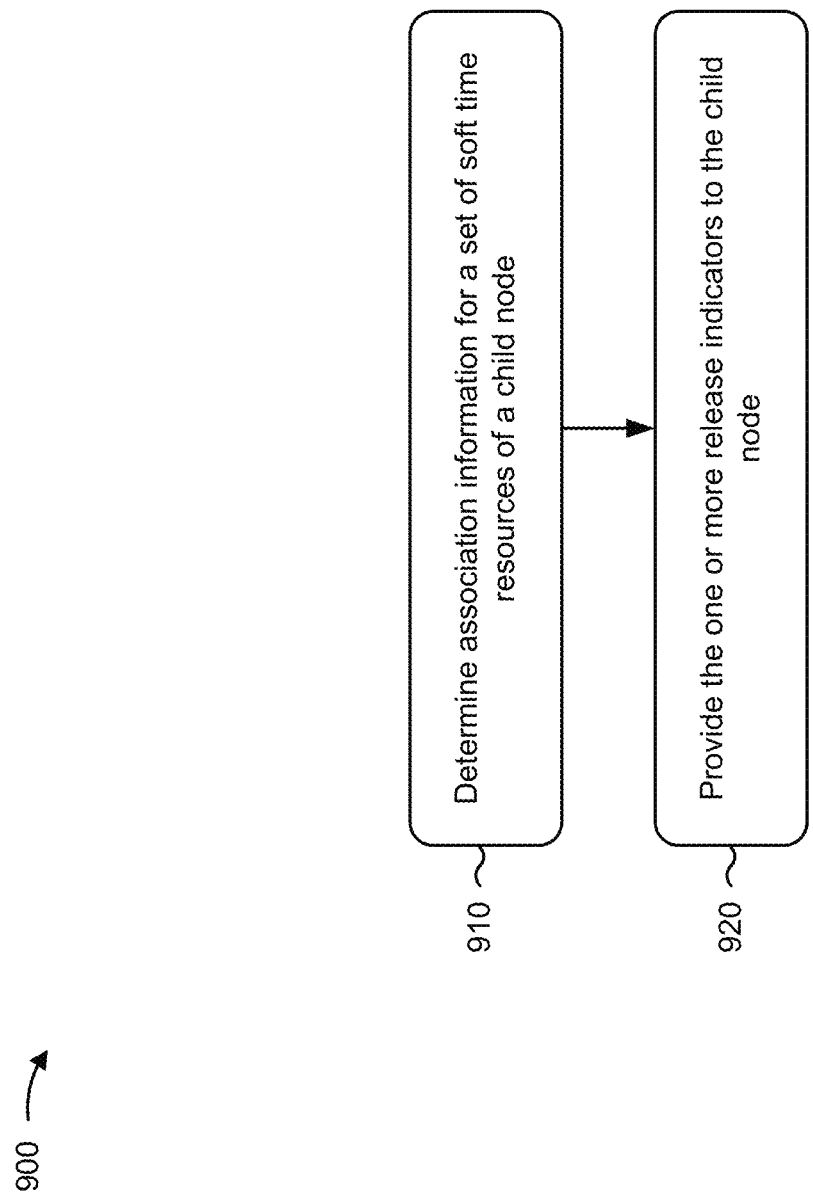

CONFIGURATION OF SOFT TIME RESOURCES FOR AN IAB NODE WITH MULTIPLE PARENT NODES

CROSS-REFERENCE TO RELATED APPLICATION

This application claims priority to U.S. Provisional Patent Application No. 62/754,523, filed on Nov. 1, 2018, entitled "CONFIGURATION OF SOFT TIME RESOURCES FOR AN IAB NODE WITH MULTIPLE PARENT NODES," which is hereby expressly incorporated by reference herein.

INTRODUCTION

Aspects of the present disclosure generally relate to wireless communication, and more particularly to techniques and apparatuses for configuration of resources for an integrated access and backhaul (IAB) node.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a wireless node in an integrated access and backhaul (IAB) network may include receiving association information for a set of soft resources of the wireless node. The association information may indicate one or more parent nodes associated with a soft resource of the set of soft resources. The set of soft resources may be configurable as schedulable or non-schedulable for the wireless node. The method may include determining one or more release indications associated with the soft resource. The method may include scheduling on the soft resource based at least in part on determining the one or more release indications.

In some aspects, a wireless node in an IAB network may include memory and one or more processors coupled to the memory. The memory and the one or more processors may be configured to receive association information for a set of soft resources of the wireless node. The association information may indicate one or more parent nodes associated with a soft resource of the set of soft resources. The set of soft resources may be configurable as schedulable or non-schedulable for the wireless node. The memory and the one or more processors may be configured to determine one or more release indications associated with the soft resource. The memory and the one or more processors may be configured to schedule on the soft resource based at least in part on determining the one or more release indications.

In some aspects, a non-transitory computer-readable medium may store one or more instructions for wireless communication. The one or more instructions, when executed by one or more processors of a wireless node in an IAB network, may cause the one or more processors to receive association information for a set of soft resources of the wireless node. The association information may indicate one or more parent nodes associated with a soft resource of the set of soft resources. The set of soft resources may be configurable as schedulable or non-schedulable for the wireless node. The one or more instructions, when executed by one or more processors of a wireless node in an IAB network, may cause the one or more processors to determine one or more release indications associated with the soft resource. The one or more instructions, when executed by one or more processors of a wireless node in an IAB network, may cause the one or more processors to schedule on the soft resource based at least in part on determining the one or more release indications.

In some aspects, an apparatus for wireless communication may include means for receiving association information for a set of soft resources of the wireless node. The association information may indicate one or more parent nodes associated with a soft resource of the set of soft resources. The set of soft resources may be configurable as schedulable or non-schedulable for the wireless node. The apparatus may include means for determining one or more release indications associated with the soft resource. The apparatus may include means for scheduling on the soft resource based at least in part on determining the one or more release indications.

In some aspects, a method of wireless communication performed by a wireless node in an integrated access and backhaul (IAB) network may include determining association information for a set of soft resources of a child node. The association information may indicate one or more parent nodes associated with each soft resource of the set of soft resources. The set of soft resources may be configurable in a schedulable state or a non-schedulable state based at least in part on one or more release indicators from the one or more parent nodes to the child node. The method may include providing the association information to the child node, the one or more parent nodes, or a combination thereof.

In some aspects, a wireless node in an IAB network may include memory and one or more processors coupled to the memory. The memory and the one or more processors may be configured to determine association information for a set of soft resources of a child node. The association information may indicate one or more parent nodes associated with each soft resource of the set of soft resources. The set of soft resources may be configurable in a schedulable state or a non-schedulable state based at least in part on one or more release indicators from the one or more parent nodes to the child node. The memory and the one or more processors may be configured to provide the association information to the child node, the one or more parent nodes, or a combination thereof.

In some aspects, a non-transitory computer-readable medium may store one or more instructions for wireless communication. The one or more instructions, when executed by one or more processors of a wireless node in an IAB network, may cause the one or more processors to determine association information for a set of soft resources of a child node. The association information may indicate one or more parent nodes associated with each soft resource of the set of soft resources. The set of soft resources may be configurable in a schedulable state or a non-schedulable state based at least in part on one or more release indicators from the one or more parent nodes to the child node. The one or more instructions, when executed by one or more processors of a wireless node in an IAB network, may cause the one or more processors to provide the association information to the child node, the one or more parent nodes, or a combination thereof.

In some aspects, an apparatus for wireless communication may include means for determining association information for a set of soft resources of a child node. The association information may indicate one or more parent nodes associated with each soft resource of the set of soft resources. The set of soft resources may be configurable in a schedulable state or a non-schedulable state based at least in part on one or more release indicators from the one or more parent nodes to the child node. The apparatus may include means for providing the association information to the child node, the one or more parent nodes, or a combination thereof.

In some aspects, a method of wireless communication performed by a wireless node in an integrated access and backhaul (IAB) network may include determining association information for a set of soft resources of a child node. The association information may indicate one or more wireless nodes associated with the set of soft resources. The one or more wireless nodes may include the wireless node. The set of soft resources may be configurable in a schedulable state or a non-schedulable state based at least in part on one or more release indicators from the one or more wireless nodes to the child node. The method may include providing the one or more release indicators to the child node.

In some aspects, a wireless node in an IAB network may include memory and one or more processors operatively coupled to the memory. The memory and the one or more processors may be configured to determine association information for a set of soft resources of a child node. The association information may indicate one or more wireless nodes associated with the set of soft resources. The one or more wireless nodes may include the wireless node. The set of soft resources may be configurable in a schedulable state or a non-schedulable state based at least in part on one or more release indicators from the one or more wireless nodes to the child node. The memory and the one or more processors may be configured to provide the one or more release indicators to the child node.

In some aspects, a non-transitory computer-readable medium may store one or more instructions for wireless communication. The one or more instructions, when executed by one or more processors of a wireless node in an IAB network, may cause the one or more processors to determine association information for a set of soft resources of a child node. The association information may indicate one or more wireless nodes associated with the set of soft resources. The one or more wireless nodes may include the wireless node. The set of soft resources may be configurable in a schedulable state or a non-schedulable state based at least in part on one or more release indicators from the one or more wireless nodes to the child node. The one or more instructions, when executed by one or more processors of a wireless node in an IAB network, may cause the one or more processors to provide the one or more release indicators to the child node.

In some aspects, an apparatus for wireless communication may include means for determining association information for a set of soft resources of a child node. The association information may indicate one or more wireless nodes associated with the set of soft resources. The one or more wireless nodes may include the wireless node. The set of soft resources may be configurable in a schedulable state or a non-schedulable state based at least in part on one or more release indicators from the one or more wireless nodes to the child node. The apparatus may include means for providing the one or more release indicators to the child node.

Aspects generally include a method, apparatus, system, computer program product, non-transitory computer-readable medium, user equipment, base station, wireless communication device, wireless node, central unit, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating an example process performed, for example, by a wireless node, in accordance with various aspects of the present disclosure.

FIG. 9 is a diagram illustrating an example process performed, for example, by a wireless node, in accordance with various aspects of the present disclosure.

DETAILED DESCRIPTION

Figure 1:
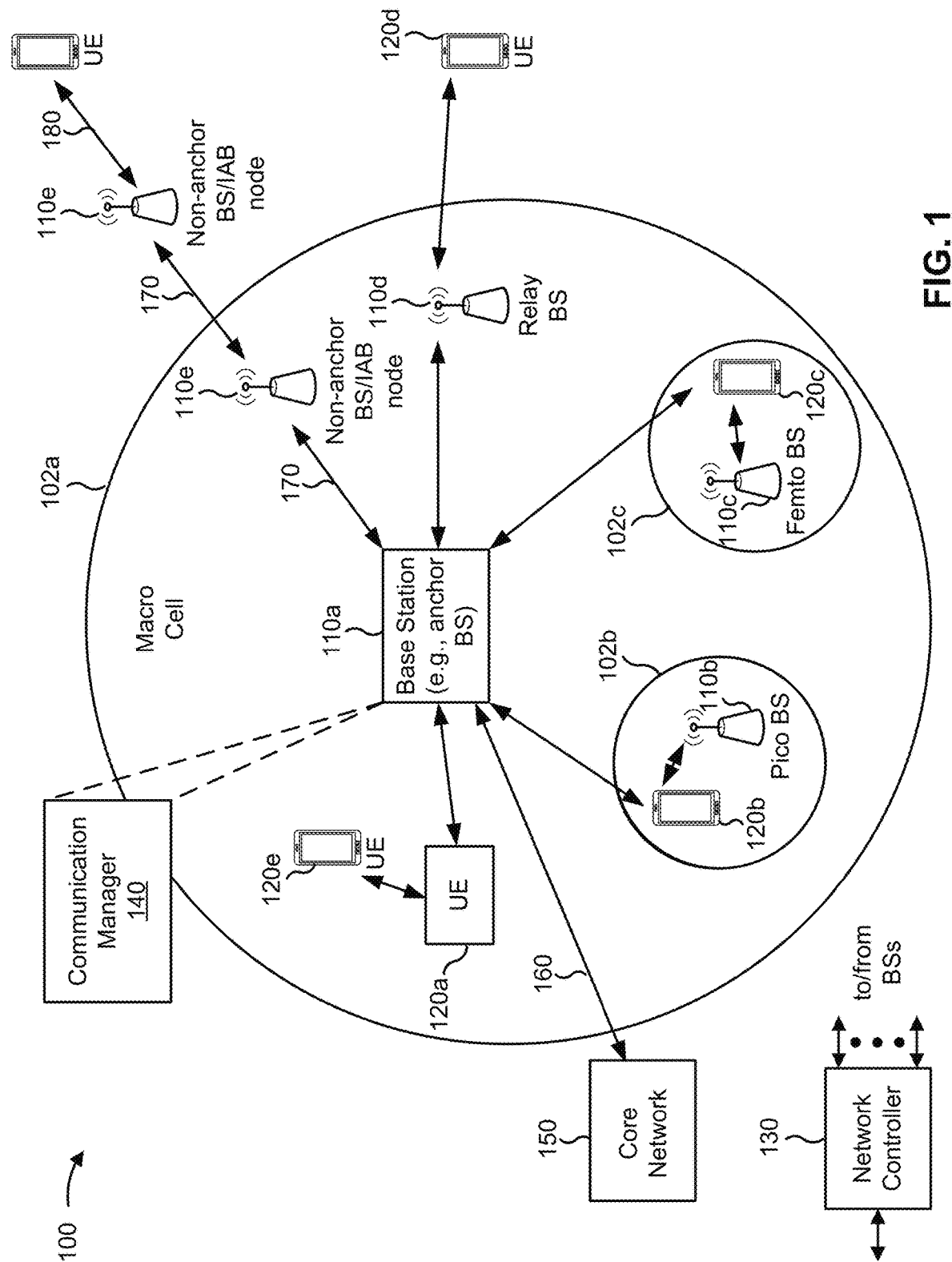
FIG. 1 is a block diagram conceptually illustrating an example of a wireless communication network, in accordance with various aspects of the present disclosure.

An IAB network may include a central unit and a plurality of IAB nodes. The central unit may perform configuration or other network functions for the plurality of IAB nodes. In some aspects, an IAB node may include an IAB donor, an anchor node, a non-anchor node, or a UE. A parent node (e.g., an IAB donor, an anchor node, or a non-anchor node) may have some control over resources of a child node (e.g., a non-anchor node or a UE) associated with the parent node. For example, a resource of the child node may be configurable by the parent node as schedulable by the child node or non-schedulable by the child node. Such a resource may be referred to as a soft resource of the child node. A child node may be associated with a parent node, meaning that that parent node can configure the child node's soft resources as schedulable or non-schedulable. A resource for which a release indication has been received from a parent node may be schedulable by the child node.

In some aspects, a child node may have multiple parent nodes. For example, multiple parent nodes may have at least partial control over resources of the child node. In such a case, it may be unclear how a child node's resource, such as soft time resources or other types of resources, should be configured. For example, it may be unclear whether the child node should consider a resource released when a release indication from a single parent node is received, or whether the child node should require release indications from all parent nodes before releasing the resource.

Some techniques and apparatuses described herein provide a mechanism for configuration of resources, such as soft time resources or other types of resources. In some aspects, techniques and apparatuses described herein may provide for the determination of when a resource (e.g., a soft resource) should be released by a child node associated with multiple parent nodes. The child node may receive association information indicating one or more parent nodes that are associated with a set of resources of the child node. The association information may indicate that the one or more parent nodes are to have control over the set of resources. In other words, the association information may indicate that a release indication from the one or more parent nodes is to be obeyed with regard to the set of resources. In some aspects, a single parent node of the child node may have control over all resources of the child node. In some aspects, a first group of parent nodes may have control over a first subset of the set of resources, and a second group of parent nodes may have control over a second subset of the set of resources. In some aspects, the child node may release a resource or use the resource to schedule a communication based at least in part on receiving a release indication from one or more parent nodes of the one or more parent nodes identified by the association information for that resource. In some aspects, the child node may release the resource or use it to schedule a communication only when release indications are received from all parent nodes associated with a child node. In this way, ambiguity regarding the release of resources of a child node is reduced, thereby improving network efficiency and resource allocation of an IAB network.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network, a 5G or NR network, and/or the like. Wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, the base station 110 may include a communication manager 140. As described in more detail elsewhere herein, the communication manager 140 may receive association information for a set of soft resources of the wireless node; determine one or more release indications associated with the soft resource; schedule on the soft resource based at least in part on determining the one or more release indications; determine association information for a set of soft resources of a child node; provide the association information to the child node, the one or more parent nodes, or a combination thereof; determine association information for a set of soft resources of a child node; provide the one or more release indicators to the child node; determine one or more respective resource patterns for at least one of the child node, the one or more parent nodes, or a combination thereof; provide the one or more respective resource patterns; provide the one or more respective resource patterns to one or more distributed units of the one or more parent nodes; provide the association information to one or more distributed units of the one or more parent nodes; provide the association information to the child node; receive the association information from a central unit; and/or the like. Additionally, or alternatively, the communication manager 140 may perform one or more other operations described herein. In some aspects, the communication manager 140 may be included in network controller 130 or UE 110, or network controller 130 or UE 110 may have a communication manager that performs operations similar to those described as being performed by the communication manager 140.

Base station 110 (e.g., base station 110*a* or another base station shown in FIG. 1) may connect to a core network 150 via a backhaul 160. For example, the backhaul 160 may be a fiber backhaul. Base station 110*a* is referred to as an anchor BS in the terminology of an integrated access and backhaul (IAB) network, since base station 110*a* provides a fiber connection to the core network 150. Base station 110*a* may communicate with one or more base stations 110*e* (shown as non-anchor BS/IAB node) via a wireless connection 170. A non-anchor BS is a base station that does not provide a fiber connection to the core network 160. In an IAB network, a series of non-anchor BSs may access the core network 150 via wireless connections 170 and via the backhaul 160. A UE 120 may access the core network via an access link 180. In some aspects, a parent IAB node (e.g., an anchor BS 110, a non-anchor BS 110, and/or the like) may manage resources of a child IAB node (e.g., a non-anchor BS 110 or a UE 120). In this case, the parent IAB node may release resources of the child IAB node for use by the child IAB node. Techniques and apparatuses described herein provide management of resources of a child node when the child node is associated with multiple parent nodes.

As indicated above, FIG. 1 is provided merely as an example. Other examples may differ from what is described with regard to FIG. 1.

Figure 2:
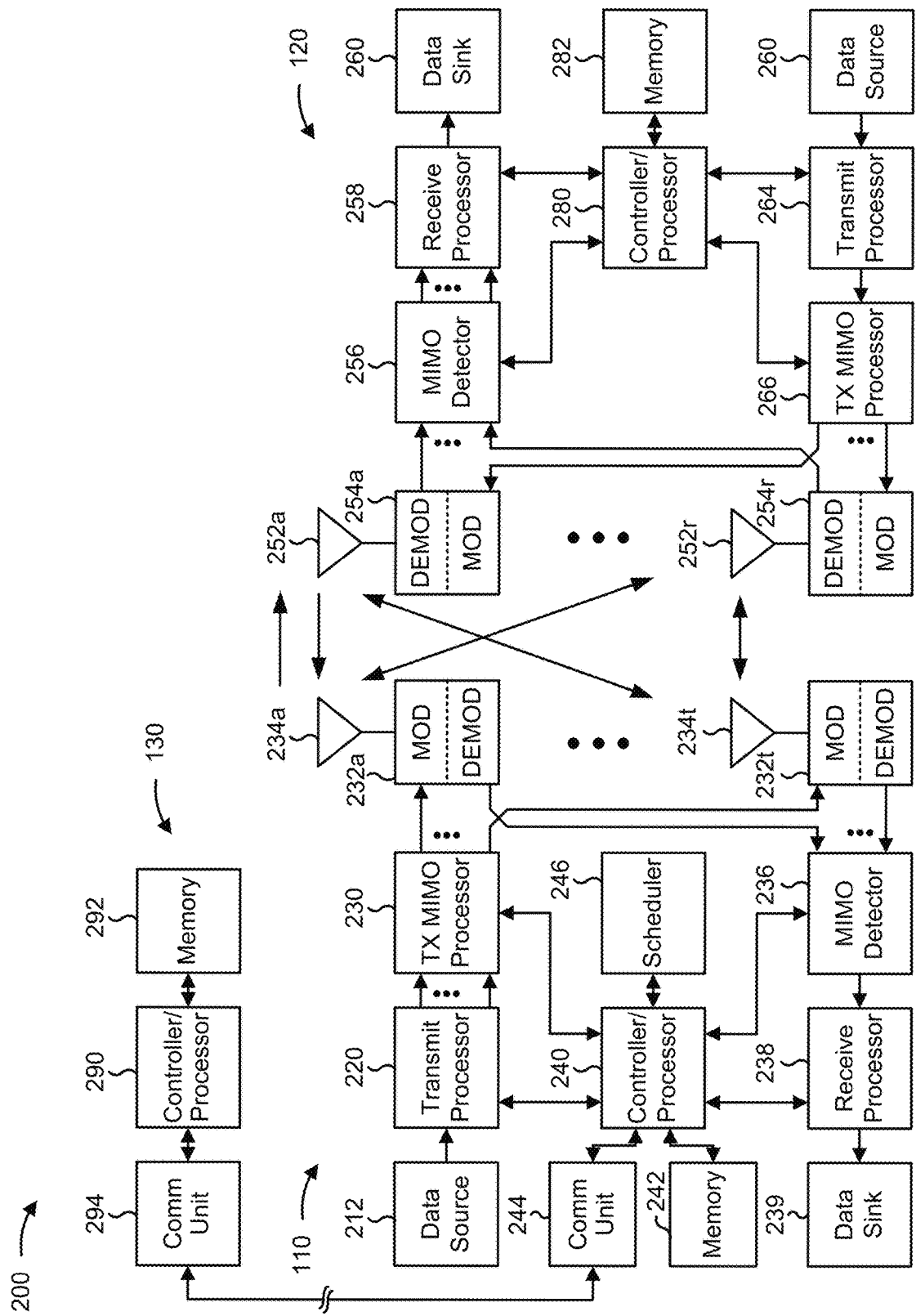
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with configuration of soft time resources for an IAB node with multiple parent nodes, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, a wireless node, such as an IAB node or a central unit (e.g., base station 110 or UE 120) may include means for receiving association information for a set of soft resources of the wireless node; means for determining one or more release indications associated with the soft resource; means for scheduling on the soft resource based at least in part on determining the one or more release indications; means for determining association information for a set of soft resources of a child node; means for providing the association information to the child node, the one or more parent nodes, or a combination thereof; means for determining association information for a set of soft resources of a child node; means for providing the one or more release indicators to the child node; means for determining one or more respective resource patterns for at least one of the child node, the one or more parent nodes, or a combination thereof; means for providing the one or more respective resource patterns; means for providing the one or more respective resource patterns to one or more distributed units of the one or more parent nodes; means for providing the association information to one or more distributed units of the one or more parent nodes; means for providing the association information to the child node; means for receiving the association information from a central unit; and/or the like. Additionally, or alternatively, the base station 110 may include means for performing one or more other operations described herein. In some aspects, such means may include the communication manager 140. In some aspects, such means may include one or more components of the base station 110 described in connection with FIG. 2.

As indicated above, FIG. 2 is provided merely as an example. Other examples may differ from what is described with regard to FIG. 2.

Figure 3:
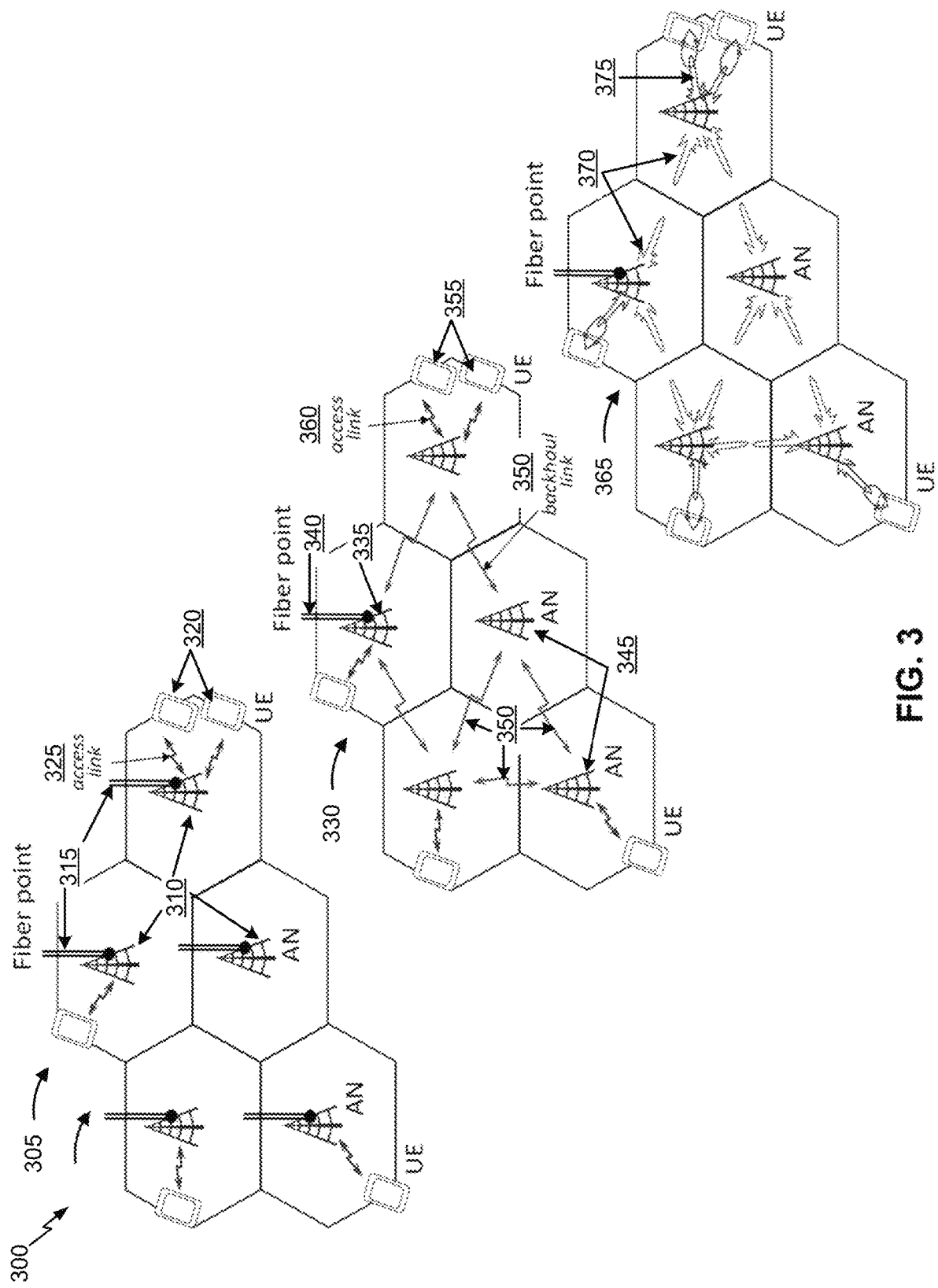
FIG. 3 is a diagram illustrating examples of radio access networks, in accordance with various aspects of the disclosure.

FIG. 3 is a diagram illustrating examples 300 of radio access networks, in accordance with various aspects of the disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may correspond to a base station 110 shown in FIG. 1. Similarly, a UE 320 shown in FIG. 3 may correspond to a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations, IAB nodes (or IAB-nodes). The non-anchor base station 345 may communicate directly with or indirectly with (e.g., via one or more non-anchor base stations 345) the anchor base station 335 via one or more backhaul links 350 to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may correspond to a base station 110 shown in FIG. 1. Similarly, a UE 355 shown in FIG. 3 may correspond to a UE 120 shown in FIG. 1.

As shown by reference number 365, in some aspects, a radio access network that includes an IAB network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links 370 between base stations may use millimeter waves to carry information and/or may be directed toward a target base station using beamforming, precoding, and/or the like. Similarly, the wireless access links 375 between a UE and a base station may use millimeter waves and/or may be directed toward a target wireless node (e.g., a UE and/or a base station). In this way, inter-link interference may be reduced.

The configuration of base stations and UEs in FIG. 3 is shown as an example, and other examples are possible. For example, one or more base stations illustrated in FIG. 3 may be replaced by one or more UEs that communicate via a UE-to-UE access network (e.g., a peer-to-peer network, a device-to-device network, and/or the like). In this case, an anchor node may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
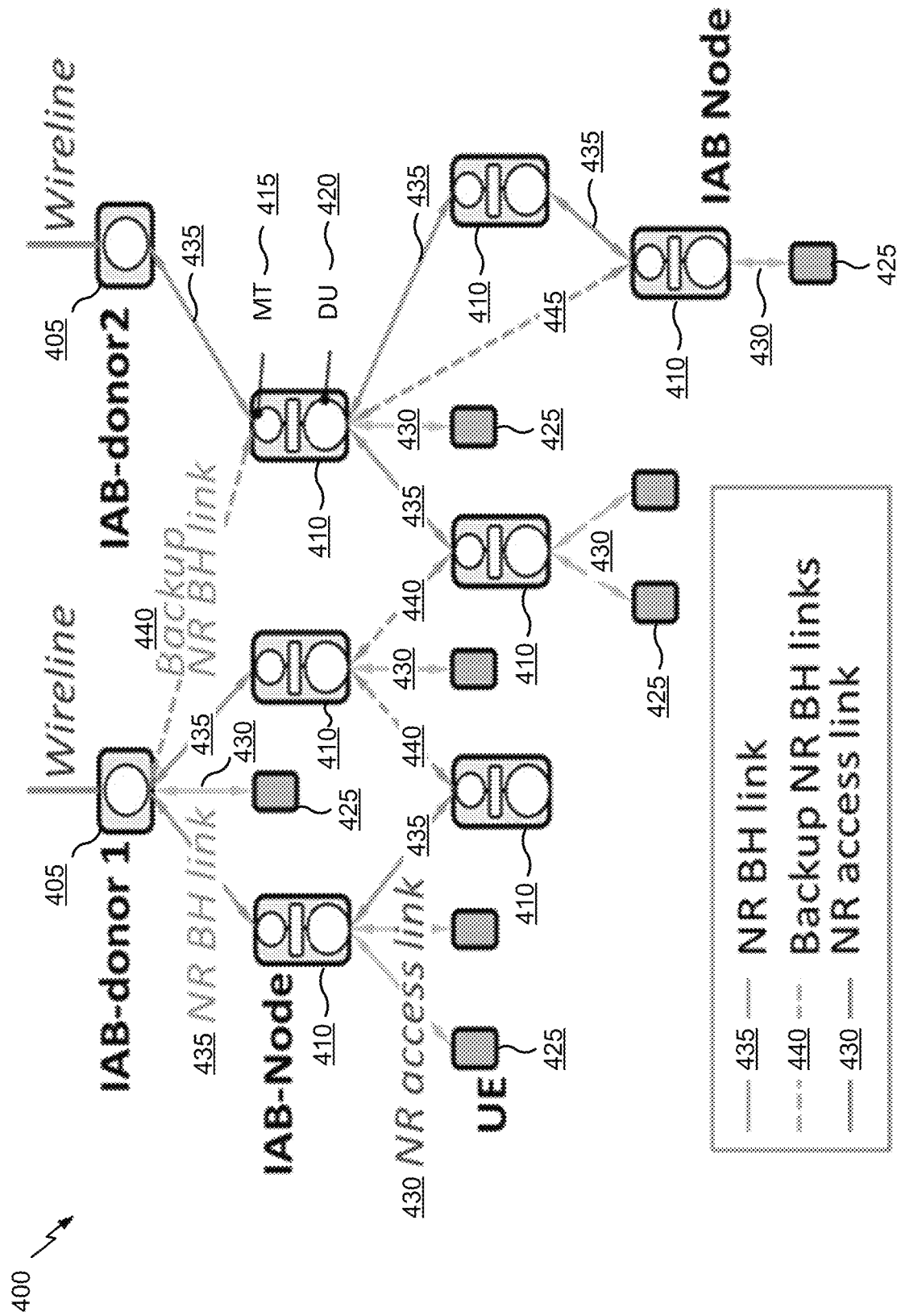
FIG. 4 is a diagram illustrating an example of an integrated access and backhaul (IAB) network architecture, in accordance with various aspects of the disclosure.

FIG. 4 is a diagram illustrating an example 400 of an integrated access and backhaul (IAB) network architecture, in accordance with various aspects of the disclosure.

As shown in FIG. 4, an IAB network may include anchor nodes 405, or IAB donors (shown as IAB-donor), that connect to a core network via a wired connection (shown as wireline). For example, an Ng interface of an anchor node 405 may terminate at a core network. Additionally, or alternatively, an anchor node 405 may connect to one or more devices of the core network that provide a core access and mobility management function (e.g., access management function (AMF)). In some aspects, an anchor node 405 may include a base station 110, such as an anchor base station, as described above in connection with FIG. 3.

As further shown in FIG. 4, the IAB network may include non-anchor nodes 410, or IAB nodes (shown as IAB-Node). A non-anchor node 410 may provide integrated access and backhaul functionality, and may include mobile termination (MT) functions 415 (also sometimes referred to as UE functions (UEF)) and distributed unit (DU) functions 420 (also sometimes referred to as access node functions (ANF)). The MT functions 415 may be controlled and/or scheduled by another non-anchor node 410 and/or an anchor node 405. The DU functions 420 may control and/or schedule other non-anchor nodes 410 and/or UEs 425 (e.g., which may correspond to UEs 120). In some aspects, an anchor node 405 may include only DU functions 420, and not MT functions 415. That is, an anchor node 405 may control and schedule communications with non-anchor nodes 410 and/or UEs 425. Additionally, or alternatively, a UE 425 may include only MT functions 415, and not DU functions 420. That is, communications of a UE 425 may be controlled and/or scheduled by an anchor node 405 and/or a non-anchor node 410.

When a first node controls and/or schedules communications for a second node (e.g., when the first node provides DU functions for the second node's MT functions), the first node may be referred to as a parent node of the second node, and the second node may be referred to as a child node of the first node. Thus, a DU function 420 of a parent node may control and/or schedule communications for child nodes of the parent node. A parent node may be an anchor node 405 or a non-anchor node 410, and the child node may be a non-anchor node 410 or a UE 425. Communications of an MT function 415 of a child node may be controlled and/or scheduled by a parent node of the child node.

As further shown in FIG. 4, a link between a UE 425 (e.g., which only has MT functions 415, and not DU functions 420) and an anchor node 405 or between a UE 425 and a non-anchor node 410 may be referred to as an access link 430. Access link 430 may be a wireless access link that provides a UE 425 with radio access to a core network via an anchor node 405, and optionally via one or more non-anchor nodes 410.

As further shown in FIG. 4, a link between an anchor node 405 and a non-anchor node 410 or between two non-anchor nodes 410 may be referred to as a backhaul link 435. Backhaul link 435 may be a wireless backhaul link that provides a non-anchor node 410 with radio access to a core network via an anchor node 405, and optionally via one or more other non-anchor nodes 410. In some aspects, a backhaul link 435 may be a primary backhaul link (shown as backhaul link 435) or a secondary backhaul link 440 (e.g., a backup backhaul link). In some aspects, a secondary backhaul link 445 may be used if a primary backhaul link fails, becomes congested, becomes overloaded, and/or the like.

As indicated above, FIG. 4 is provided as an example. Other examples may differ from what is described with regard to FIG. 4.

Figure 5:
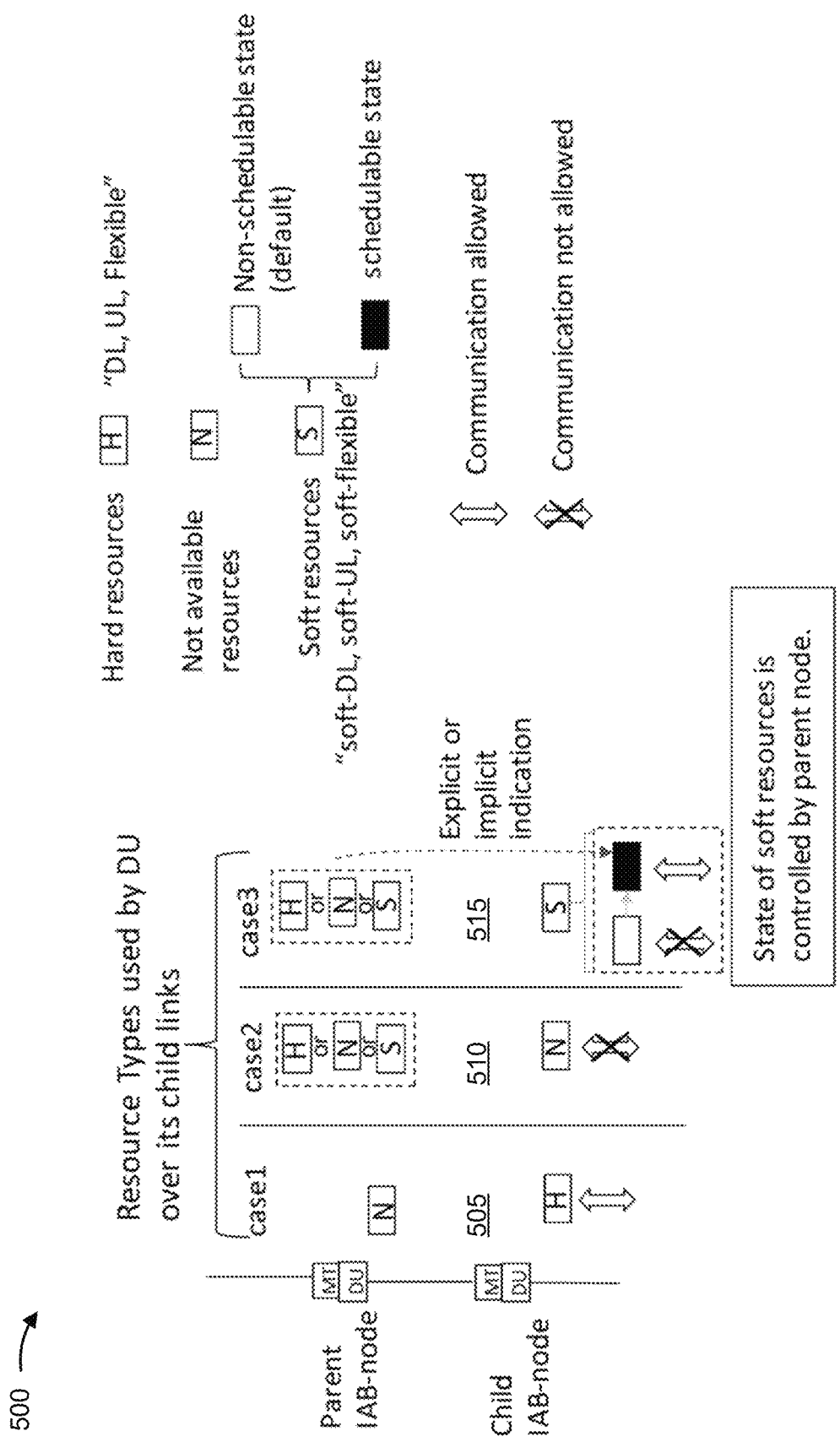
FIG. 5 is a diagram illustrating an example of resource types in an IAB network, in accordance with various aspects of the disclosure.

FIG. 5 is a diagram illustrating an example 500 of resource types in an IAB network, in accordance with various aspects of the disclosure.

In an IAB network, resources (such as time resources or another type of resource) may be configured as downlink-only, uplink-only, flexible, or not available (e.g., unavailable). When a resource is configured as downlink-only for a wireless node, that time resource may be available for only downlink communications of the wireless node, and not uplink communications. Similarly, when a time resource is configured as uplink-only for a wireless node, that resource may be available for only uplink communications of the wireless node, and not downlink communications. When a resource is configured as flexible for a wireless node, that resource may be available for both downlink communications and uplink communications of the wireless node. When a resource is configured as not available for a wireless node, that resource may not be used for any communications of the wireless node. It should be noted that the techniques and apparatuses described herein for time resources can be applied for any type of resource (e.g., frequency resource, spatial resource, code resource, and/or the like).

Resources in an IAB network that are configured as downlink-only, uplink-only, or flexible may be further configured as hard resources or soft resources. When a resource is configured as a hard resource for a wireless node, that resource is always available for communications of the wireless node. For example, a hard downlink-only resource is always available for only downlink communications of the wireless node, a hard uplink-only resource is always available for only uplink communications of the wireless node, and a hard flexible resource is always available for uplink and downlink communications of the wireless node.

When a resource is configured as a soft resource for a wireless node, the availability of that resource is controlled by a parent node of the wireless node. For example, the parent node may indicate (e.g., explicitly or implicitly) whether a soft resource is available for communications of the wireless node. Thus, a soft resource may be in one of two states: a schedulable state (e.g., when the soft resource is available for scheduling and/or communications of the wireless node) and a non-schedulable state (e.g., when the soft resource is not available for scheduling and is not available for communications of the wireless node).

For example, a soft downlink-only resource is only available for downlink communications of the wireless node when a parent node of the wireless node indicates that the soft downlink-only resource is available. Similarly, a soft uplink-only resource is only available for uplink communications of the wireless node when a parent node of the wireless node indicates that the soft uplink-only resource is available. A soft flexible resource is only available for uplink and downlink communications of the wireless node when a parent node of the wireless node indicates that the soft flexible resource is available.

As an example, and as shown by reference number 505, a resource may be configured as hard for a child node, and may be configured as not available for a parent node of the child node. In this case, the parent node cannot communicate using that resource, but the child node can schedule communications in that resource and/or communicate using that resource. This configuration may reduce interference between the parent node and the child node, may reduce scheduling conflicts between the parent node and the child node, and/or the like.

As another example, and as shown by reference number 510, a resource may be configured as not available for the child node, and may be configured as hard, soft, or not available for the parent node (e.g., depending on a network configuration, network conditions, a configuration of a parent node of the parent node, and/or the like). In this case, the child node cannot schedule communications in that resource and cannot communicate using that resource.

As another example, and as shown by reference number 515, a resource may be configured as soft for the child node, and may be configured as hard, soft, or not available for the parent node (e.g., depending on a network configuration, network conditions, a configuration of a parent node of the parent node, and/or the like). In this case, the child node cannot schedule or communicate using the resource unless the child node receives an indication, from the parent node (e.g., explicitly or implicitly), that the resource is available for use by the child node. If the child node receives such an indication, then the child node can schedule communications in that resource and/or communicate using that resource.

In some aspects, a child node may have multiple parent nodes. For example, multiple parent nodes may have at least partial control over resources of the child node. In such a case, it may be unclear how a child node's soft resource should be configured. For example, it may be unclear whether the child node should consider a soft resource released when a release indication from a single parent node is received, or whether the child node should require release indications from all parent nodes before releasing the soft resource.

Some techniques and apparatuses described herein provide a mechanism for determining when a soft resource should be released by a child node associated with multiple parent nodes. The child node may receive association information indicating one or more parent nodes that are associated with a set of soft resources of the child node. The association information may indicate that the one or more parent nodes are to have control over the set of soft resources. In other words, the association information may indicate that a release indication from the one or more parent nodes is to be obeyed with regard to the set of soft resources. In some aspects, a single parent node of the child node may have control over all soft resources of the child node. In some aspects, a first group of parent nodes may have control over a first subset of the set of soft resources, and a second group of parent nodes may have control over a second subset of the set of resources. In some aspects, the child node may release a soft resource or use it to schedule a communication based at least in part on receiving a release indication from one or more parent nodes of the one or more parent nodes identified by the association information for that soft resource. In some aspects, the child node may release the soft resource or use it to schedule a communication only when release indications are received from all parent nodes associated with a child node. In this way, ambiguity regarding the release of soft resources of a child node is reduced, thereby improving network efficiency and resource allocation of an IAB network.

As indicated above, FIG. 5 is provided as an example. Other examples may differ from what is described with regard to FIG. 5.

Figure 6:
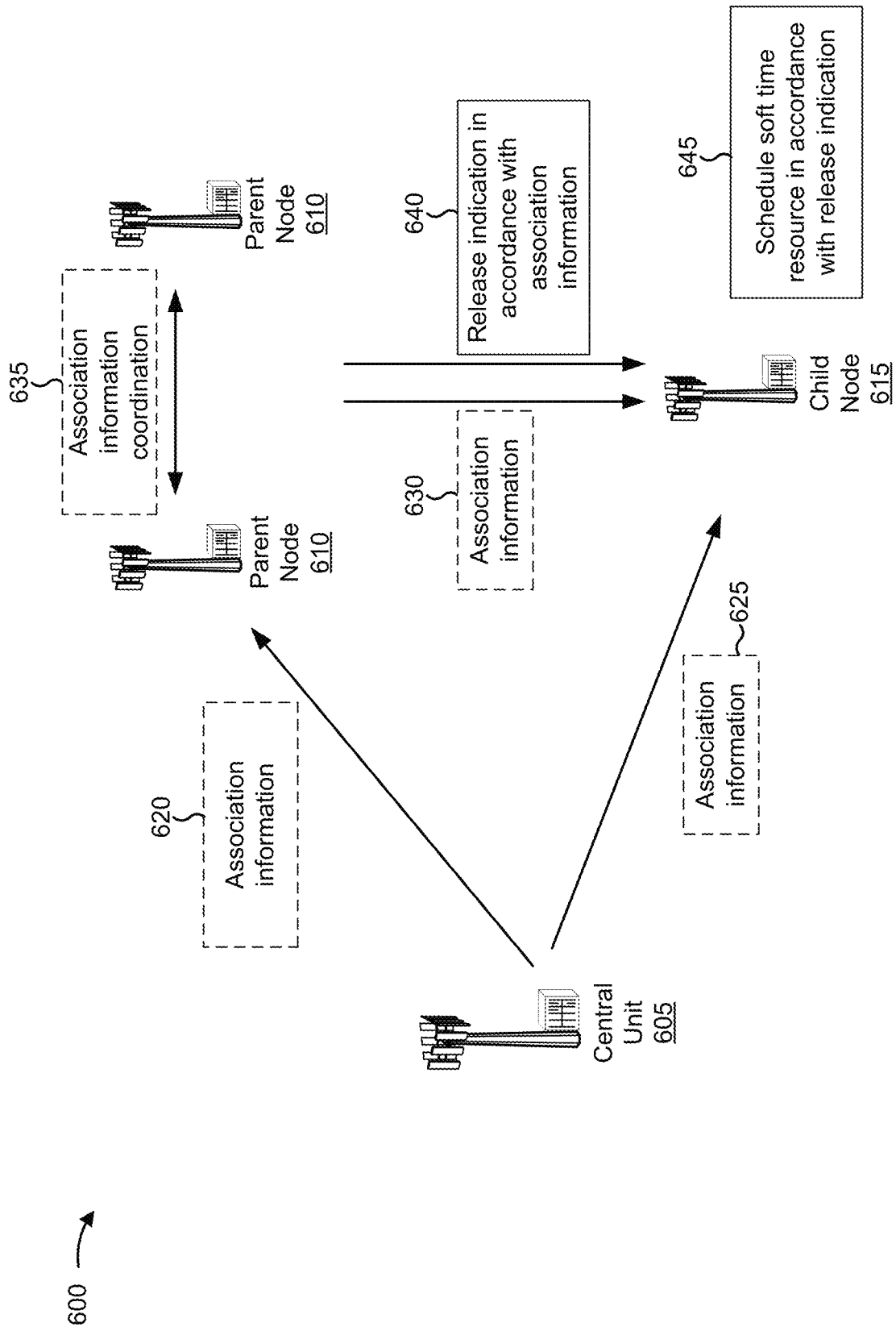
FIG. 6 is a diagram illustrating an example of configuration of resources for an IAB node with multiple parent nodes, in accordance with various aspects of the present disclosure.

FIG. 6 is a diagram illustrating an example 600 of configuration of soft resources for an IAB node with multiple parent nodes, in accordance with various aspects of the present disclosure. As shown, example 600 includes a central unit 605 (e.g., BS 110, network controller 130, anchor base station 335, anchor node 405, etc.), a set of parent nodes 610 (e.g., BS 110, base station 310, non-anchor base station 345, non-anchor node 410, a DU function 420, an MT function 415, etc.), and a child node 615 (e.g., BS 110, UE 120, base station 310, non-anchor base station 345, non-anchor node 410, a DU function 420, an MT function 415, etc.). In FIG. 6, two parent nodes 610 are shown for illustrative purposes, although some of the operations described in connection with FIG. 6 may be performed by a single parent node 610, and some of the operations described in connection with FIG. 6 may be performed by two or more parent nodes 610.

As shown in FIG. 6, and by reference number 620, the central unit 605 may optionally provide association information to the parent node(s) 610. The association information may indicate one or more parent nodes (e.g., parent node(s) 610) associated with each soft resource of a set of soft resources of the child node 615. In some aspects, the association information may indicate, for each parent node 610 associated with the child node 615, one or more soft resources with which each parent node 610 is associated. In some aspects, the central unit 605 may provide the association information to a distributed unit of the parent node(s) 610. For example, a central unit of the central unit 605 may provide the association information to the distributed unit.

In some aspects, a single parent node 610 (e.g. identified as the primary parent) may be associated with the set of soft resources. For example, in a case when the set of soft resources includes all resources of the child node 615, the single parent node 610 may be associated with all resources of the child node 615.

In some aspects, the set of resources may include two or more subsets of soft resources. In some aspects, the two or more subsets of soft resources may be overlapping, or may not be overlapping. In some aspects, the two or more subsets of soft resources may not be overlapping. In some aspects, the association information may identify a respective parent node 610 for each subset of soft resources, of the two or more subsets of soft resources. In some aspects, the association information may identify a respective set of parent nodes 610 (e.g., one or more parent nodes 610) for each subset of soft resources of the two or more subsets of soft resources. In some aspects, the respective sets of parent nodes 610 may have one or more parent nodes 610 in common. In some aspects, the respective sets of parent nodes 610 may have no parent nodes 610 in common.

In some aspects, the central unit 605 may determine the association information. For example, the central unit 605 may determine the control information based at least in part on respective resource patterns of the parent node(s) 610 and/or the child node 615.

In some aspects, the central unit 605 may provide a subset of the association information. For example, assume that the parent node(s) 610 include a first parent node 610 and a second parent node 610, and assume that these two parent nodes 610 are associated with different subsets of the soft resources of the child node 615. In that case, the central unit 605 may provide a first subset of the association information to the first parent node 610 and a second subset of the association information to the second parent node 610. Each subset of the association information may relate to the corresponding subset of soft resources for the corresponding parent node 610. Thus, network resources are conserved in comparison to providing all association information to all parent nodes 610.

As shown by reference number 625, the central unit 605 may optionally provide association information to the child node 615. For example, the central unit 605 may provide association information for the parent node(s) 610 of the child node 615 to the child node 615, thereby conserving network and interface resources of the parent node(s) 610 that would otherwise be used to provide the association information. In such a case, a central unit of the central unit 605 may provide the association information to a distributed unit of the child node 615 (e.g., via upper-layer signaling, such as an F1-AP message), and the distributed unit of the child node 615 may provide the association information to an MT of the child node 615 (e.g., via an internal interface of the child node 615).

As shown by reference number 630, the parent node(s) 610 may optionally provide association information to the child node 615. For example, one or more distributed units of the parent node(s) 610 may provide the association information to an MT of the child node 615 (e.g., using a system information block, downlink control information, a media access control (MAC) control element (CE), radio resource control signaling, etc.), and the MT of the child node 615 may provide the association information to a distributed unit of the child node 615 (e.g., via an internal interface of the child node 615).

In some aspects, each parent node 610 may provide a respective part of the association information to the child node 615. For example, each parent node 610 may provide association information for the soft resource(s) associated with that parent node 610, which may reduce the interface and/or communication load on any one parent node 610. In this case, the child node 615 may determine the association information using the respective parts of the association information, thereby reducing processor load on the parent nodes 610. In some aspects, a single parent node 610 may provide all association information for the child node 615 to the child node 615, which may conserve interface and/or communication resources of the other parent nodes 610 and/or processor resources of the child node 615.

As shown by reference number 635, the parent node(s) 610 may optionally coordinate to determine the association information. For example, the parent nodes 610 may perform signaling with each other to determine the association information. In some aspects, this signaling may be performed via one or more intermediate devices, such as the central unit 605, another IAB node, and/or the like.

As shown by reference number 640, the parent node(s) 610 may provide a release indication in accordance with the association information. For example, assume that a particular soft resource of the child node 615 is to be released and assume that the particular soft resource is associated with a set of parent nodes 610 (e.g., one or more parent nodes 610). In that case, the set of parent nodes 610 may provide the release indication in accordance with the association information, so that the particular soft resource is released. In some aspects, when the set of parent nodes 610 includes multiple parent nodes 610, the set of parent nodes 610 may coordinate with each other to determine which parent node 610 is to provide the release indication. This may be advantageous when each parent node 610 has access only to the corresponding part of the association information.

In some aspects, multiple parent nodes 610 may be associated with a particular soft resource. In that case, in some aspects, a single release indication from any parent node of the multiple parent nodes 610 may cause the child node 615 to release or use the particular soft resource. In some aspects, the child node 615 may only release or use the particular soft resource when all parent nodes of the multiple parent nodes 610 have provided a release indication.

As shown by reference number 645, the child node 615 may schedule a soft resource in accordance with the release indication. In other words, the child node 615 may release the soft resource or use it to schedule a communication in accordance with the release indication based at least in part on the association information. Thus, a child node 615 that is associated with multiple parent nodes 610 may be configured to release or utilize a soft resource in accordance with association information, thereby improving network utilization and flexibility of IAB networks. Furthermore, the usage of the association information technique may reduce network overhead in comparison to other techniques, such as providing resource mappings of the parent nodes and allowing the child node to determine whether a release indication should be permitted based at least in part on the resource mappings.

As indicated above, FIG. 6 is provided as an example. Other examples may differ from what is described with respect to FIG. 6.

Figure 7:
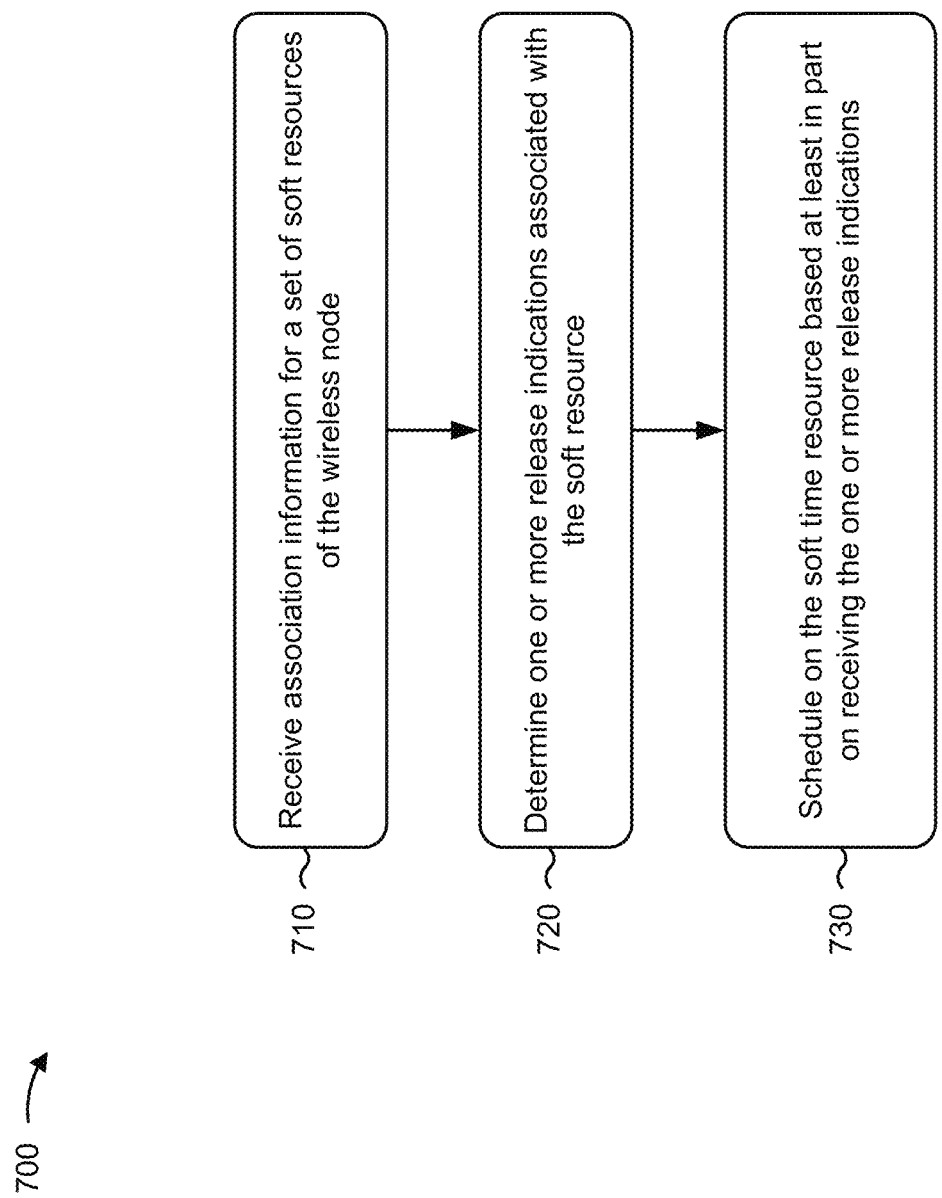
FIG. 7 is a diagram illustrating an example process performed, for example, by a wireless node, in accordance with various aspects of the present disclosure.

FIG. 7 is a diagram illustrating an example process 700 performed, for example, by a wireless node, in accordance with various aspects of the present disclosure. Example process 700 is an example where a wireless node (e.g., BS 110, UE 120, base station 310, non-anchor base station 345, non-anchor node 410, a DU function 420, an MT function 415, child node 615) performs configuration of soft resources for an integrated access and backhaul (IAB) node with multiple parent nodes.

As shown in FIG. 7, in some aspects, process 700 may include receiving association information for a set of soft resources of the wireless node (block 710). For example, the wireless node (e.g., using antenna 234, DEMOD 232, MIMO detector 236, receive processor 238, controller/processor 240, and/or the like) may receive association information for a set of soft resources of the wireless node. In some aspects, the set of soft resources may include all soft resources of the wireless node. In some aspects, the set of soft resources may include a proper subset of soft resources of the wireless node. The association information may indicate one or more parent nodes associated with each soft resource of the set of soft resources. The set of soft resources may be configurable as schedulable or non-schedulable for the wireless node.

As shown in FIG. 7, in some aspects, process 700 may include determining one or more release indications associated with the soft resource (block 720). For example, the wireless node (e.g., using controller/processor 240, transmit processor 220, TX MIMO processor 230, MOD 232, antenna 234, and/or the like) may determine one or more release indications associated with the soft resource. In some aspects, the wireless node may receive the one or more release indications from at least one parent node of the one or more parent nodes.

As shown in FIG. 7, in some aspects, process 700 may include scheduling on the soft resource based at least in part on determining the one or more release indications (block 730). For example, the wireless node (e.g., using controller/processor 240, transmit processor 220, TX MIMO processor 230, MOD 232, antenna 234, and/or the like) may schedule on a soft resource, of the set of soft resources, based at least in part on receiving one or more release indications from at least one parent node associated with the soft resource. The at least one parent node may be included in the one or more parent nodes. In some aspects, the wireless node may schedule a communication for another wireless node, such as a child node of the wireless node.

Process 700 may include additional aspects, such as any single aspect or any combination of aspects described below and/or in connection with one or more other processes described elsewhere herein.

In a first aspect, determining the one or more release indications comprises receiving the one or more release indications from at least one parent node of the one or more parent nodes. In a second aspect, alone or in combination with the first aspect, the at least one parent node is included in a plurality of parent nodes associated with the wireless node. In a third aspect, alone or in combination with at least one of the first aspect and/or the second aspect, scheduling on the soft resource is based at least in part on receiving the one or more release indications from each of the plurality of parent nodes associated with the soft resource. In a fourth aspect, alone or in combination with at least one of the first through third aspects, scheduling on the soft resource is based at least in part on receiving the one or more release indications from a single one of the plurality of parent nodes associated with the soft resource.

In a fifth aspect, alone or in combination with at least one of the first through fourth aspects, the one or more parent nodes comprises a single parent node associated with the set of soft resources of the wireless node. In a sixth aspect, alone or in combination with at least one of the first through fifth aspects, the set of soft resources comprises two or more subsets of soft resources, and wherein the two or more subsets of soft resources are associated with respective sets of parent nodes of the one or more parent nodes. In a seventh aspect, alone or in combination with at least one of the first through sixth aspects, the two or more subsets of soft resources are at least partially overlapping. In an eighth aspect, alone or in combination with at least one of the first through seventh aspects, a parent node is included in two or more sets of parent nodes of the respective sets of parent nodes.

In a ninth aspect, alone or in combination with at least one of the first through eighth aspects, the association information is received from a central unit of the wireless node. In a tenth aspect, alone or in combination with at least one of the first through ninth aspects, the association information is received from a parent node of the one or more parent nodes. In an eleventh aspect, alone or in combination with at least one of the first through tenth aspects, multiple parts of the association information are received from respective parent nodes of the one or more parent nodes, and the association information is generated from the multiple parts.

In a twelfth aspect, alone or in combination with at least one of the first through eleventh aspects, multiple parts of the association information identify which soft resources, of the set of soft resources, are associated with respective parent nodes of the one or more parent nodes. In a thirteenth aspect, alone or in combination with at least one of the first through twelfth aspects, the association information is received by a distributed unit of the wireless node from a central unit. In a fourteenth aspect, alone or in combination with at least one of the first through thirteenth aspects, the association information is received by a mobile termination of the wireless node from the one or more parent nodes.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a wireless node, in accordance with various aspects of the present disclosure. Example process 800 is an example where a wireless node (e.g., BS 110, network controller 130, anchor base station 335, anchor node 405, central unit 605) performs configuration of soft resources for an integrated access and backhaul (IAB) node with multiple parent nodes.

As shown in FIG. 8, in some aspects, process 800 may include determining association information for a set of soft resources of a child node (block 810). For example, the wireless node (e.g., using controller/processor 290, controller/processor 240, transmit processor 220, TX MIMO processor 230, MOD 232, antenna 234, and/or the like) may determine association information for a set of soft resources of a child node. The association information may indicate one or more parent nodes associated with each soft resource of the set of soft resources. The set of soft resources may be configurable in a schedulable state or a non-schedulable state based at least in part on one or more release indicators from the one or more parent nodes to the child node.

As shown in FIG. 8, in some aspects, process 800 may include providing the association information to the child node, the one or more parent nodes, or a combination thereof (block 820). For example, the wireless node (e.g., using controller/processor 290, communication unit 294, controller/processor 240, transmit processor 220, TX MIMO processor 230, MOD 232, antenna 234, and/or the like) may provide the association information to the child node. In some aspects, the wireless node may provide the association information to the one or more parent nodes.

Process 800 may include additional aspects, such as any single aspect or any combination of aspects described below and/or in connection with one or more other processes described elsewhere herein.

In a first aspect, providing the association information to the child node, the one or more parent nodes, or a combination thereof is performed using upper layer signaling (e.g., radio resource control (RRC) signaling, non-access stratum signaling, downlink control information, and/or the like). In a second aspect, alone or in combination with the first aspect, the wireless node may determine one or more respective resource patterns for at least one of the child node, the one or more parent nodes, or a combination thereof; and provide the one or more respective resource patterns. In a third aspect, alone or in combination with at least one of the first aspect and the second aspect, providing the one or more respective resource patterns comprises providing the one or more respective resource patterns to one or more distributed units of the one or more parent nodes.

In a fourth aspect, alone or in combination with one or more of the first through third aspects, the wireless node, when providing the association information, may provide the association information to one or more distributed units of the one or more parent nodes.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a wireless node, in accordance with various aspects of the present disclosure. Example process 900 is an example where a wireless node (e.g., BS 110, base station 310, non-anchor base station 345, non-anchor node 410, a DU function 420, an MT function 415, parent node 610) performs configuration of soft resources for an integrated access and backhaul (IAB) node with multiple parent nodes.

As shown in FIG. 9, in some aspects, process 900 may include determining association information for a set of soft resources of a child node (block 910). For example, the wireless node (e.g., using antenna 234, DEMOD 232, MIMO detector 236, receive processor 238, controller/processor 240, and/or the like) may determine (e.g., receive) association information for a set of soft resources of a child node. In some aspects, the association information may indicate one or more wireless nodes associated with the set of soft resources. The one or more wireless nodes may include the wireless node. The set of soft resources may be configurable in a schedulable state or a non-schedulable state based at least in part on one or more release indicators from the one or more wireless nodes to the child node.

As shown in FIG. 9, in some aspects, process 900 may include providing the one or more release indicators to the child node (block 920). For example, the wireless node (e.g., using controller/processor 240, transmit processor 220, TX MIMO processor 230, MOD 232, antenna 234, and/or the like) may provide the one or more release indicators to the child node.

Process 900 may include additional aspects, such as any single aspect or any combination of aspects described below and/or in connection with one or more other processes described elsewhere herein.

In a first aspect, the wireless node may provide the association information to the child node. In a second aspect, alone or in combination with the first aspect, the association information is determined in coordination by the one or more wireless nodes. In a third aspect, alone or in combination with one or more of the first aspect and the second aspect, the association information is specific to the wireless node. In a fourth aspect, alone or in combination with one or more of the first through third aspects, the association information is received from a central unit.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a wireless node in an integrated access and backhaul (IAB) network, comprising:
   receiving association information for a set of soft resources of the wireless node, the wireless node being a child node of a plurality of parent nodes, the association information indicating one or more parent nodes of the plurality of parent nodes associated with each soft resource of the set of soft resources, the set of soft resources being configurable as schedulable or non-schedulable for the wireless node, the soft resource being one of a soft time resource, a soft frequency resource, a soft spatial resource, or a soft code resource;
   determining one or more release indications associated with a soft resource of the set of soft resources; and
   scheduling on the soft resource based at least in part on determining the one or more release indications.

2. The method of claim 1, wherein determining the one or more release indications comprises receiving the one or more release indications from at least one parent node of the one or more parent nodes.

3. The method of claim 2, wherein the at least one parent node is included in a plurality of parent nodes associated with the wireless node.

4. The method of claim 3, wherein scheduling on the soft resource is based at least in part on receiving the one or more release indications from each of the one or more parent nodes of the plurality of parent nodes associated with the soft resource.

5. The method of claim 3, wherein scheduling on the soft resource is based at least in part on receiving the one or more release indications from a single parent node of the one or more parent nodes of the plurality of parent nodes associated with the soft resource.

6. The method of claim 1, wherein the one or more parent nodes comprises a single parent node associated with the set of soft resources of the wireless node.

7. The method of claim 1, wherein the set of soft resources comprises two or more subsets of soft resources, and wherein the two or more subsets of soft resources are associated with respective sets of parent nodes of the one or more parent nodes.

8. The method of claim 7, wherein the two or more subsets of soft resources are at least partially overlapping.

9. The method of claim 7, wherein a parent node is included in two or more sets of parent nodes of the respective sets of parent nodes.

10. The method of claim 1, wherein the association information is received from a central unit of the wireless node.

11. The method of claim 1, wherein the association information is received from a parent node of the one or more parent nodes.

12. The method of claim 1, wherein multiple parts of the association information are received from respective parent nodes of the one or more parent nodes, and wherein the association information is generated from the multiple parts.

13. The method of claim 1, wherein multiple parts of the association information identify which soft resources, of the set of soft resources, are associated with respective parent nodes of the one or more parent nodes.

14. The method of claim 1, wherein the association information is received by a distributed unit of the wireless node from a central unit.

15. The method of claim 1, wherein the association information is received by a mobile termination of the wireless node from the one or more parent nodes.

16. The method of claim 1, wherein the soft resource being configurable as schedulable or non-schedulable for the wireless node is controlled by a plurality of parent nodes of the one or more parent nodes associated with the soft resource.

17. The method of claim 8, wherein the soft resource is included in an at least partially overlapping subset of soft resources of the two or more subsets of soft resources, the determining the one or more release indications comprising:
receiving the one or more release indications from one or more parent nodes in at least partially overlapping subset of the respective two or more sets of parent nodes of the one or more parent nodes.

18. The method of claim 1, wherein the soft resource is a soft time resource.

19. The method of claim 1, wherein the soft resource is a soft frequency resource.

20. The method of claim 1, wherein the soft resource is a soft spatial resource.

21. The method of claim 1, wherein the soft resource is a soft code resource.

22. A method of wireless communication performed by a wireless node in an integrated access and backhaul (IAB) network, comprising:
determining association information for a set of soft resources of a child node of a plurality of parent nodes, the association information indicating one or more parent nodes of the plurality of parent nodes associated with each soft resource of the set of soft resources, the set of soft resources being configurable in a schedulable state or a non-schedulable state based at least in part on one or more release indicators from the one or more parent nodes to the child node, the soft resource being one of a soft time resource, a soft frequency resource, a soft spatial resource, or a soft code resource; and
providing the association information to the child node, the one or more parent nodes, or a combination thereof.

23. The method of claim 22, wherein providing the association information to the child node, the one or more parent nodes, or a combination thereof is performed using upper layer signaling.

24. The method of claim 22, further comprising:
determining one or more respective resource patterns for at least one of the child node, the one or more parent nodes, or a combination thereof; and
providing the one or more respective resource patterns.

25. The method of claim 24, wherein providing the one or more respective resource patterns comprises:
providing the one or more respective resource patterns to one or more distributed units of the one or more parent nodes.

26. The method of claim 22, wherein providing the association information comprises:
providing the association information to one or more distributed units of the one or more parent nodes.

27. A method of wireless communication performed by a wireless node in an integrated access and backhaul (IAB) network, comprising:
determining association information for a set of soft resources of a child node, the child node being a child node of a plurality of wireless nodes, the association information indicating one or more wireless nodes of the plurality of wireless nodes associated with each soft resource of the set of soft resources, the one or more wireless nodes including the wireless node, and the set of soft resources being configurable in a schedulable state or a non-schedulable state based at least in part on one or more release indicators from the one or more wireless nodes to the child node, the soft resource being one of a soft time resource, a soft frequency resource, a soft spatial resource, or a soft code resource; and
providing the one or more release indicators to the child node.

28. The method of claim 27, further comprising:
providing the association information to the child node.

29. The method of claim 27, wherein the association information is determined in coordination by the one or more wireless nodes.

30. The method of claim 27, wherein the association information is specific to the wireless node.

31. The method of claim 27, wherein the association information is received from a central unit.

32. The method of claim 27, wherein determining the association information further comprises receiving the association information from a central unit.

33. A wireless node for wireless communication, comprising:
a memory; and
one or more processors coupled to the memory, the memory and the one or more processors configured to:
receive association information for a set of soft resources of the wireless node, the wireless node being a child node of a plurality of parent nodes, the association information indicating one or more parent nodes of the plurality of parent nodes associated with each soft resource of the set of soft resources, the set of soft resources being configurable as schedulable or non-schedulable for the wireless node, the soft resource being one of a soft time resource, a soft frequency resource, a soft spatial resource, or a soft code resource;
determine one or more release indications associated with the soft resource; and
schedule on the soft resource based at least in part on determining the one or more release indications.

34. The wireless node of claim 33, wherein the memory and the one or more processors, in configuring to determine the one or more release indications, are further configured to receive the one or more release indications from at least one parent node of the one or more parent nodes.

35. The wireless node of claim 34, wherein the at least one parent node is included in a plurality of parent nodes associated with the wireless node.

36. The wireless node of claim 35, wherein configuring to schedule on the soft resource is based at least in part on the memory and the one or more processors configuring to receive the one or more release indications from the plurality parent nodes of the one or more parent nodes associated with the soft resource.

37. A wireless node for wireless communication, comprising:
means for receiving association information for a set of soft resources of the wireless node, the wireless node being a child node of a plurality of parent nodes, the association information indicating one or more parent nodes of the plurality of parent nodes associated with each soft resource of the set of soft resources, the set of soft resources being configurable as schedulable or non-schedulable for the wireless node, the soft resources being one of a soft resource, a soft resource, a soft spatial resource, or a soft code resource;

means for determining one or more release indications associated with a soft resource of the set of soft resources; and means for scheduling on the soft resource based at least in part on determining the one or more release indications.

38. The wireless node of claim 37, wherein the means for determining the one or more release indications comprises means for receiving the one or more release indications from at least one parent node of the one or more parent nodes.

39. The wireless node of claim 38, wherein the at least one parent node is included in a plurality of parent nodes associated with the wireless node.

40. The wireless node of claim 39, wherein the means for scheduling on the soft resource is based at least in part on the means for receiving the one or more release indications from each of the plurality of parent nodes associated with the soft resource.

41. A non-transitory computer-readable medium storing one or more instructions for wireless communication, the one or more instructions comprising:

one or more instructions that, when executed by a wireless node in an integrated access and backhaul (IAB) network, cause the wireless node to:

receive association information for a set of soft resources of the wireless node, the wireless node being a child node of a plurality of parent nodes, the association information indicating one or more parent nodes of the plurality of parent nodes associated with each soft resource of the set of soft resources, the set of soft resources being configurable as schedulable or non-schedulable for the wireless node, the soft resource being one of a soft resource, a soft frequency resource, a soft spatial resource, or a soft code resource;

determine one or more release indications associated with the soft resource; and schedule on the soft resource based at least in part on determining the one or more release indications.

42. The non-transitory computer-readable medium of claim 41, wherein the one or more instructions that, when executed by the wireless node, cause the wireless node to determine the one or more release indications further comprises one or more instructions that, when executed by the wireless node, cause the wireless node to:

receive the one or more release indications from at least one parent node of the one or more parent nodes.

43. The non-transitory computer-readable medium of claim 42, wherein the at least one parent node is included in a plurality of parent nodes associated with the wireless node.

44. The non-transitory computer-readable medium of claim 43, wherein executing the one or more instructions by the wireless node to cause the wireless node to schedule on the soft resource is based at least in part on one or more instructions, that when executed by the wireless node, cause the wireless node to receive the one or more release indications from the plurality parent nodes of the one or more parent nodes associated with the soft resource.

45. A wireless node for wireless communication, comprising: a memory; and one or more processors coupled to the memory, the memory and the one or more processors configured to: determine association information for a set of soft resources of a child node of a plurality of parent nodes, the association information indicating one or more parent nodes of the plurality of parent nodes associated with each soft resource of the set of soft resources, the set of soft resources being configurable in a schedulable state or a non-schedulable state based at least in part on one or more release indicators from the one or more parent nodes to the child node, the soft resource being one of a soft time resource, a soft frequency resource, a soft spatial resource, or a soft code resource; and provide the association information to the child node, the one or more parent nodes, or a combination thereof.

46. The wireless node of claim 45, wherein the association information is provided to the child node, the one or more parent nodes, or a combination thereof using upper layer signaling.

47. The wireless node of claim 45, wherein the memory and the one or more processors are further configured to:

determine one or more respective resource patterns for at least one of the child node, the one or more parent nodes, or a combination thereof; and provide the one or more respective resource patterns.

48. The wireless node of claim 47, wherein to configure to provide the one or more respective resource patterns, the memory and the one or more processors are configured to:

provide the one or more respective resource patterns to one or more distributed units of the one or more parent nodes.

49. The wireless node of claim 45, wherein to configure to provide the association information, the memory and the one or more processors are configured to:

provide the association information to one or more distributed units of the one or more parent nodes.

50. A wireless node for wireless communication, comprising:

means for determining association information for a set of soft resources of a child node of a plurality of parent nodes, the association information indicating one or more parent nodes of the plurality of parent nodes associated with each soft resource of the set of soft resources, the set of soft resources being configurable in a schedulable state or a non-schedulable state based at least in part on one or more release indicators from the one or more parent nodes to the child node, the soft resource being one of a soft time resource, a soft frequency resource, a soft spatial resource, or a soft code resource; and means for providing the association information to the child node, the one or more parent nodes, or a combination thereof.

51. A non-transitory computer-readable medium storing one or more instructions for wireless communication, the one or more instructions comprising: one or more instructions that, when executed by a wireless node in an integrated access and backhaul (IAB) network, cause the wireless node to: determine association information for a set of soft resources of a child node of a plurality of parent nodes, the association information indicating one or more parent nodes of the plurality of parent nodes associated with each soft resource of the set of soft resources, the set of soft resources being configurable in a schedulable state or a non- schedulable state based at least in part on one or more release indicators from the one or more parent nodes to the child node, the soft resource being one of a soft time resource, a soft frequency resource, a soft spatial resource, or a soft code resource; and provide the association information to the child node, the one or more parent nodes, or a combination thereof.

52. The non-transitory computer-readable medium of 51, wherein the association information is provided to the child node, the one or more parent nodes, or a combination thereof using upper layer signaling.

53. The non-transitory computer-readable medium of 51, wherein the one or more instructions further cause the wireless node to:
determine one or more respective resource patterns for at least one of the child node, the one or more parent nodes, or a combination thereof; and
provide the one or more respective resource patterns.

54. The non-transitory computer-readable medium of 53, wherein the one or more instructions that, when executed by the wireless node, cause the wireless node to provide the one or more respective resource patterns further comprises one or more instructions that, when executed by the wireless node, cause the wireless node to:
provide the one or more respective resource patterns to one or more distributed units of the one or more parent nodes.

55. The non-transitory computer-readable medium of 51, wherein the one or more instructions that, when executed by the wireless node, cause the wireless node to provide the association information to one or more distributed unites of the one or more parent nodes further comprises one or more instructions that, when executed by the wireless node, cause the wireless node to:
provide the association information to one or more distributed units of the one or more parent nodes.

56. A wireless node for wireless communication, comprising:
a memory; and
one or more processors coupled to the memory, the memory and the one or more processors configured to:
determine association information for a set of soft resources of a child node, the child node being a child node of a plurality of wireless nodes, the association information indicating one or more wireless nodes of the plurality of wireless nodes associated with each soft resource of the set of soft resources, the one or more wireless nodes including the wireless node, and the set of soft resources being configurable in a schedulable state or a non-schedulable state based at least in part on one or more release indicators from the one or more wireless nodes to the child node, the soft resource being one of a soft time resource, a soft frequency resource, a soft spatial resource, or a soft code resource; and
provide the one or more release indicators to the child node.

57. The wireless node of claim 56, wherein the memory and the one or more processors are further configured to:
provide the association information to the child node.

58. The wireless node of claim 56, wherein the association information is determined in coordination by the one or more wireless nodes.

59. The wireless node of claim 56, wherein the association information is specific to the wireless node.

60. The wireless node of claim 56, wherein the association information is received from a central unit.

61. The wireless node of claim 56, wherein to determine the association information, the memory and the one or more processors are further configured to:
receive the association information from a central unit.

62. A wireless node for wireless communication, comprising:
means for determining association information for a set of soft resources of a child node, the child node being a child node of a plurality of wireless nodes, the association information indicating one or more wireless nodes of the plurality of wireless nodes associated with each soft resource of the set of soft resources, the one or more wireless nodes including the wireless node, and the set of soft resources being configurable in a schedulable state or a non-schedulable state based at least in part on one or more release indicators from the one or more wireless nodes to the child node, the soft resource being one of a soft time resource, a soft frequency resource, a soft spatial resource, or a soft code resource; and
means for providing the one or more release indicators to the child node.

63. A non-transitory computer-readable medium storing one or more instructions for wireless communication, the one or more instructions comprising:
one or more instructions that, when executed by a wireless node in an integrated access and backhaul (IAB) network, cause the wireless node to:
determine association information for a set of soft resources of a child node, the child node being a child node of a plurality of wireless nodes, the association information indicating one or more wireless nodes of the plurality of wireless nodes associated with each soft resource of the set of soft resources, the one or more wireless nodes including the wireless node, and the set of soft resources being configurable in a schedulable state or a non-schedulable state based at least in part on one or more release indicators from the one or more wireless nodes to the child node, the soft resource being one of a soft time resource, a soft frequency resource, a soft spatial resource, or a soft code resource; and
provide the one or more release indicators to the child node.

64. The non-transitory computer-readable medium of 63, wherein the one or more instructions further cause the wireless node to:
provide the association information to the child node.

65. The non-transitory computer-readable medium of 63, wherein the association information is determined in coordination by the one or more wireless nodes.

66. The non-transitory computer-readable medium of 63, wherein the association information is specific to the wireless node.

67. The non-transitory computer-readable medium of 63, wherein the association information is received from a central unit.

68. The non-transitory computer-readable medium of 63, wherein the one or more instructions that, when executed by the wireless node, cause the wireless node to determine the association information further comprises one or more instructions that, when executed by the wireless node, cause the wireless node to:
receive the association information from a central unit.

* * * * *